United States Patent [19]

Pfefferle

[11] 3,928,961
[45] Dec. 30, 1975

[54] CATALYTICALLY-SUPPORTED THERMAL COMBUSTION

[75] Inventor: William C. Pfefferle, Middletown, N.J.

[73] Assignee: Engelhard Minerals & Chemicals Corporation, Murray Hill, N.J.

[22] Filed: May 8, 1973

[21] Appl. No.: 358,411

Related U.S. Application Data

[63] Continuation-in-part of Ser. No. 142,939, May 13, 1971, abandoned, and a continuation-in-part of Ser. No. 164,718, July 21, 1971, abandoned.

[52] U.S. Cl. ............ 60/39.02; 60/39.17; 60/39.69; 60/39.71; 60/39.82 C; 431/7; 60/DIG. 11
[51] Int. Cl.$^2$ ..................... F02C 3/04; F02M 27/02
[58] Field of Search ............ 60/39.02, 39.03, 39.04, 60/39.06, 301, 39.82 C, 39.17, 39.74, 39.65, 39.69, 39.71, DIG. 11; 431/7, 328, 351, 352

[56] References Cited
UNITED STATES PATENTS

| | | | |
|---|---|---|---|
| 1,349,040 | 8/1920 | Bone et al. | 431/7 |
| 2,095,065 | 10/1937 | Hays | 431/7 |
| 2,624,172 | 1/1953 | Houdry | 60/39.82 C |
| 2,632,296 | 3/1953 | Houdry | 60/39.82 C |
| 2,970,439 | 2/1961 | Berl | 60/39.82 C |
| 3,115,925 | 12/1963 | Ulmer et al. | 431/7 |
| 3,155,142 | 11/1964 | Stack | 431/328 |
| 3,191,659 | 6/1965 | Weiss | 431/328 |
| 3,363,663 | 1/1968 | Porter | 431/7 |
| 3,370,914 | 2/1968 | Gross et al. | 60/301 |
| 3,383,159 | 5/1968 | Smith | 431/7 |
| 3,577,731 | 5/1971 | Bruchez | 60/39.82 C |
| 3,751,906 | 8/1973 | Leas et al. | 431/7 |
| 3,890,088 | 6/1975 | Ferri | 431/351 |

FOREIGN PATENTS OR APPLICATIONS

| | | | |
|---|---|---|---|
| 842,780 | 7/1960 | United Kingdom | 60/39.82 C |
| 407,590 | 3/1934 | United Kingdom | 60/39.82 C |
| 741,506 | 12/1955 | United Kingdom | 60/39.82 C |
| 277,604 | 4/1928 | United Kingdom | 60/39.82 C |

OTHER PUBLICATIONS

Smith, I. E., Editor, "Combustion in Advanced Gas Turbine Systems," Pergamon Press, 1967, pp. 14–15.
"Engineering Know-How in Engine Design," Part 19, SAE; SPB65, HS–010922.
Haslam et al., *Fuels & Their Combustion*, N.Y., 1926, pp. 266, 287, 291.

*Primary Examiner*—William L. Freeh
*Assistant Examiner*—Robert E. Garrett

[57] ABSTRACT

A method for the catalytically-supported thermal combustion of carbonaceous fuel comprising the adiabatic combustion of at least a portion of the fuel admixed with air in the presence of a solid oxidation catalyst at an operating temperature substantially above the instantaneous auto-ignition temperature of the fuel-air admixture but below a temperature that would result in any substantial formation of oxides of nitrogen. The resulting effluent is characterized by high thermal energy useful for generating power and by low amounts of atmospheric pollutants, especially oxides of nitrogen.

42 Claims, 6 Drawing Figures

CATALYTICALLY-SUPPORTED THERMAL COMBUSTION

This application is a continuation-in-part of my copending applications Ser. No. 142,939, filed May 13, 1971, and now abandoned, and Ser. No. 164,718, filed July 21, 1971, and now abandoned.

This invention relates to a method for the thermal reaction of carbonaceous fuels. In its more specific aspect, this invention relates to catalytically-supported, thermal combustion of carbonaceous fuel under essentially adiabatic conditions, and without the formation of substantial amounts of nitrogen oxides.

Adiabatic combustion systems from a practical standpoint have relatively low heat losses, and the heat released from the combustion zone appears in the effluent gases as thermal energy for producing power.

In general, conventional adiabatic, thermal combustion systems (e.g., engines and power plants) operate at such high temperatures in the combustion zone as to form nitrogen oxides, sometimes referred to as oxides of nitrogen or $NO_x$, and especially includes NO. A thermal combustion system operates by contacting fuel and air in flammable proportions with an ignition source, e.g., spark, to ignite the mixture which then will continue to burn. Flammable mixtures of most fuels are normally such as to burn at relatively high temperatures, i.e., about 3300°F. and above, which inherently results in the formation of substantial amounts of $NO_x$. In the case of gas turbine combustors, the formation of $NO_x$ has been greatly reduced by limiting the residence time of the combustion products in the combustion zone. However, due to the large quantities of gases being handled, undesirable quantities of $NO_x$ are nonetheless produced. Hence, the question is not whether $NO_x$ is made, but how much.

Nitrogen oxides formation is also inherent in surface combustion systems wherein thermal combustion of a flammable mixture occurs on a hot surface generally at temperatures above or about 3300°F. Surface combustion utilizes essentially stoichiometric mixtures, and although originally regarded by the early workers in the field as being catalytic to some degree, it was later resolved that the system is non-catalytic. The advantages of such a system were that there is no flame and that the heat can be radiated efficiently from the surface. However, surface combustion has achieved only a minimal commercial success because systems with flames are actually superior for most applications.

It has long been realized that little or no $NO_x$ is formed in a system which burns the fuel catalytically at relatively low temperatures. This type of combustion, sometimes referred to as catalytic combustion, has been regarded generally as being impractical as a means of providing power and has achieved success only in special situations. For example, catalytic combustion has been employed to treat tail gas streams of nitric acid plants where the catalytic reaction is employed to heat spent process air containing about two percent oxygen to temperatures in the range of about 1400°F. The heated gases are used to power a turbine which drives the air compressor for the nitric acid plant, but such a system could not be used as a source of primary power because the amount of catalyst required would be impractically large as explained below in greater detail.

For a catalytic oxidation reaction, one can plot temperature against rate of reaction as shown in FIG. 1 in the accompanying drawings. For any given catalyst and set of reaction conditions, as the temperature is initially increased the reaction rate is also increased as shown in the kinetic region A of the rate curve of FIG. 1. This rate of increase is exponential with temperature. As the temperature is raised further, the reaction rate then passes through a transition zone where the limiting parameters determining reaction rate shift from catalytic to mass transfer (region B of the curve in FIG. 1). When the catalytic rate increases to such an extent that the reactants cannot be transferred to the catalytic surface fast enough to keep up with the catalytic reaction rate, the reaction shifts to mass transfer control, and the catalytic reaction rate levels off regardless of further temperature increases. The reaction is then said to be mass transfer limited (region C of the curve of FIG. 1). In mass transfer controlled catalytic reactions, one cannot distinguish between a more active catalyst and a less active catalyst because the intrinsic catalyst activity is not determinative of the rate of reaction. Regardless of any increase in catalytic activity above that required for mass transfer control, a greater catalytic conversion rate cannot be achieved for the same set of conditions.

Because of this limitation, in order to increase the conversion rate for any given system, it appears essential either to increase the amount of catalyst surface or to increase the rate of mass transfer of reactants to the surface. The former, for practical combustion systems, would require either a catalyst size of such magnitude as to be unwieldy or a catalyst configuration which results in increased specific pressure drop and which would require unwieldy geometry to hold a total pressure drop constant. For example, in the case of gas turbine engines, the catalytic reactor might very well be larger than the engine itself. On the other hand, increasing the rate of mass transfer of reactants to the catalytic surfaces would result in increased pressure drop and consequently a substantial loss of energy; sufficient pressure drop may not even be available to provide the desired rate of reaction. Quite obviously, these approaches, while theoretically possible, are quite impractical.

I have now discovered that it is possible to achieve essentially adiabatic combustion in the presence of a catalyst at a reaction rate many times greater than the mass transfer limited rate. That is, I have found that catalytically-supported, thermal combustion surmounts the mass transfer limitation. If the operating temperature of the catalyst is increased substantially into the mass transfer limited region, the reaction rate again begins to increase exponentially with temperature (region D of the curve of FIG. 1). This is an apparent contradiction of catalytic technology and the laws of mass transfer kinetics. The phenomena may be explained by the fact that the catalyst surface and the gas layer near the catalyst surface are above a temperature at which thermal combustion occurs at a rate higher than the catalytic rate, and the temperature of the catalyst surface is above the instantaneous auto-ignition temperature of the fuel-air admixture (defined hereinbelow). The fuel molecules entering this layer spontaneously burn without transport to the catalyst surface. As combustion progresses, it is believed that the layer becomes deeper. The total gas is ultimately raised to a temperature at which thermal reactions occur in the entire gas stream rather than only near the surface of the catalyst. At this point in the reaction, the thermal reactions continue even without further contact of the gas with the catalyst as the gas passes through the combustion zone.

The term "instantaneous auto-ignition temperature" for a fuel-air admixture as used herein and in the appended claims is defined to mean that temperature at which the ignition lag of the fuel-air mixture entering the catalyst is negligible relative to the residence time in the combustion zone of the mixture undergoing combustion.

In accordance with the invention, catalytically-supported, thermal combustion is achieved by contacting at least a portion of the carbonaceous fuel, intimately admixed with air, with a solid oxidation catalyst having an operating temperature substantially above the instantaneous auto-ignition temperature of the fuel-air admixture. At least a portion of the fuel is combusted under essentially adiabatic conditions. Combustion is characterized by the use of a fuel-air admixture having an adiabatic flame temperature substantially above the instantaneous auto-ignition temperature of the admixture but below a temperature that would result in any substantial formation of oxides of nitrogen. Theoretically, the adiabatic flame temperature would be the same throughout the combustion zone, but in practical applications where there is some heat loss, the adiabatic flame temperature is more accurately determined at the catalyst inlet. The resulting effluent is characterized by high thermal energy useful for generating power and by low amounts of atmospheric pollutants. Where desired, combustible fuel components, e.g. uncombusted fuel or intermediate combustion products contained in the effluent from the catalytic zone, or fuel-air admixture which has not passed through the catalytic zone, may be combusted in a thermal zone following the catalytic zone, as explained hereinbelow in greater detail.

Sustained catalytically-supported, thermal combustion of this invention occurs at a substantially lower temperature than in conventional adiabatic thermal combustion and therefore it is possible to operate without formation of significant amount of $NO_x$. Combustion is no longer limited by mass transfer as in the case of conventional catalytic combustion, and at the specified operating temperatures the reaction rate is substantially increased beyond the mass transfer limitation, e.g., at least about 5 to 10 times greater than the mass transfer limited rate. Reaction rates of up to about 100 or more times the mass transfer limited rate may be attainable. Such high reaction rates permit high fuel space velocities which normally are not obtainable in catalytic reactions. I can employ, for instance, at least an amount of fuel equivalent in heating value to about 300 pounds of propane per hour per cubic foot of catalyst, and this amount may be at least several times greater, for instance, an amount of fuel equivalent in heating value to at least about 1000 pounds of propane per hour per cubic foot of catalyst. There is, moreover, no necessity of maintaining fuel-to-air ratios in the flammable range, and consequently loss of combustion (flame-out) due to variations in the fuel-to-air ratio is not the problem it is in conventional combustors.

The adiabatic flame temperature of fuel-air admixtures at any set of conditions (e.g., initial temperature and, to a lesser extent, pressure) is established by the ratio of fuel to air. The admixtures utilized are generally within the flammable range or are fuel-lean outside of the flammable range, but there may be instances of a fuel-air admixture having no clearly defined flammable range but nevertheless having a theoretical adiabatic flame temperature within the operating conditions of the invention. The proportions of the fuel and air charged to the combustion zone are typically such that there is a stoichiometric excess of oxygen based on complete conversion of the fuel to carbon dioxide and water. Preferably, the free oxygen content is at least about 1.5 times the stoichiometric amount needed for complete combustion of the fuel. Although the invention is described herein with particularity to air as the non-fuel component, it is well understood that oxygen is the required element to support proper combustion. Where desired, the oxygen content of non-fuel component can be varied and the term "air" is used herein to refer to the non-fuel components of the admixtures. The fuel-air admixture fed to the combustion zone may have as low as 10 percent free oxygen by volume or less, which may occur, for example, upon utilization as a source of oxygen of a waste stream wherein a portion of this oxygen has been reacted. In turbine operations, the weight ratio of air to fuel charged to the combustion system is often above about 30:1 and some turbines are designed for air-to-fuel ratios to about 100 or 200 or more:1.

The carbonaceous fuels may be gaseous or liquid at normal temperature and pressure. Suitable hydrocarbon fuels may include, for example, low molecular weight aliphatic hydrocarbons such as methane, ethane, propane, butane, pentane; gasoline; aromatic hydrocarbons such as benzene, toluene, ethylbenzene, xylene; naphtha; diesel fuel; jet fuel; other middle distillate fuels; hydrotreated heavier fuels; and the like. Among the other useful carbonaceous fuels are alcohols such as methanol, ethanol, isopropanol; ethers such as diethylether and aromatic ethers such as ethylphenyl ether; and carbon monoxide. In burning diluted fuels containing inerts, for example, low BTU coal gas, fuel-air admixtures with adiabatic flames temperatures within the range specified herein may be either fuel rich or fuel lean. Where fuel rich mixtures are utilized, additional air or fuel-air admixture may be added to the catalyst zone effluent to provide an overall excess of air for complete combustion of fuel components to carbon dioxide and water. Thermal reactions continue beyond the catalyst zone, provided the effluent temperature is substantially above the instantaneous auto-ignition temperature.

The fuel-air admixture is generally passed to the catalyst in the combustion zone at a gas velocity prior to or at the inlet to the catalyst in excess of the maximum flame propagating velocity. This avoids flashback that causes the formation of $NO_x$. Preferably this velocity is maintained adjacent to the catalyst inlet. Suitable linear gas velocities are usually above about 3 feet per second, but it should be understood that considerably higher velocities may be required depending upon such factors as temperature, pressure, and composition. At least a significant portion of the combustion occurs in the catalytic zone and may be essentially flameless.

The carbonaceous fuel, which when burned with a stoichiometric amount of air (atmospheric composition) at the combustion inlet temperature usually has an adiabatic flame temperature of at least about 3300°F., is combusted essentially adiabatically in the catalyst zone. Although the instantaneous autoignition temperature of a typical fuel may be below about 2000°F., stable, adiabatic combustion of the fuel below about 3300°F. is extremely difficult to achieve in practical primary combustion systems. It is for this reason that even with gas turbines limited to operating temperatures of 2000°F., the primary combustion is typically at temperatures in excess of 4000°F. As stated above, in the present invention combustion is characterized by using a fuel-air admixture, having an adiabatic flame temperature substantially above the instantaneous auto-ignition temperature of the admixture but below a temperature that would result in any substantial formation of $NO_x$. The limits of this adiabatic flame temperature are governed largely by residence time and pressure. Generally, adiabatic flame temperatures of the admixtures are in the range of about 1700°F. to 3200°F., and preferably are about 2000°F. to 3000°F. Operating at a temperature much in excess of 3200°F. results in the significant formation of $NO_x$ even at short contact times; this derogates from the advantages of this invention vis-a-vis a conventional thermal system. A higher temperature within the defined range is desirable, however, because the system will require less catalyst and thermal reactions are an order of magnitude or more faster, but the adiabatic flame temperature employed can depend on such factors as the desired composition of the effluent and the overall design of the system. It thus will be observed that a fuel which would ordinarily burn at such a high temperature as to form $NO_x$, is successfully combusted within the defined temperature range without significant formation of $NO_x$. Although combustion occurs adiabatically, it should be understood that for practical operations there may be heat losses to the environment from the combustion zone. A loss in temperature as measured by the effluent temperature may be as much as about 300°F. and preferably is not more than about 150°F. Notwithstanding these minor heat losses, the operation from a practical standpoint is considered adiabatic, and the heat of reaction is released primarily in the effluent gases. Thus there may be about four times, preferably at least about seven times, more heat released (thermal energy) in these gases than is lost from the combustion zone.

The catalyst generally operates at a temperature approximating the theoretical adiabatic flame temperature of the fuel-air admixture charged to the combustion zone. The entire catalyst may not be at these temperatures, but preferably a major portion, or essentially all, of the catalyst surface is at such operating temperatures. These temperatures are usually in the range of about 1700° to 3200°F., preferably about 2000°F. to about 3000°F. The temperature of the catalyst zone is controlled by controlling the composition of the fuel-air admixture, i.e. adiabatic flame temperature, as well as the uniformity of the mixture. Relatively higher energy fuels can be admixed with larger amounts of air in order to maintain the desired temperature in a combustion zone. At the higher end of the temperature range, shorter residence times of the gas in the combustion zone appear to be desirable in order to lessen the chance of forming $NO_x$. The residence time is governed largely by temperature, pressure and space throughout, and generally is measured in milliseconds. The residence time of the gases in the catalytic combustion zone and any subsequent thermal combustion zone may be below about 0.1 second, preferably below about 0.05 second. The gas space velocity may often be, for example, in the range of about 0.5 to 10 or more million cubic feet of total gas (standard temperature and pressure) per cubic foot of total combustion zone per hour. For a stationary turbine burning diesel fuel, typical residence times could be about 30 milliseconds or less; whereas in an automotive turbine engine burning gasoline, the typical residence time may be about 5 milliseconds or less. The total residence time in the combustion system should be sufficient to provide essentially complete combustion of the fuel, but not so long as to result in the formation of $NO_x$.

Nitrogen oxides found in the effluent may have been introduced to the system from the air supply or even from the fuel as an impurity. By reason of the invention, combustion occurs, however, without the substantial formation of $NO_x$. Typically, the combustion effluent will contain less than about 15, or less than about 10, parts per million by volume of $NO_x$ above the amount fed to the combustion system. Values lower than what is present in the incoming air have been measured. It is of further significance that the effluent typically may contain less than about 10 parts per million by volume hydrocarbons, and frequently even less than about 300 parts per million by volume carbon monoxide, and even less than about 20 parts per million. Effluents this low in pollutants are most acceptable and are far below any requirements of the Federal Emission Standards established by the Environmental Protection Agency for 1976 for automobile emissions.

In order to improve the thermal efficiency of the overall system, the air, and even the fuel, may be heated before being passed into the catalytic combustion zone. The fuel-air admixture for a non-regenerative turbine at full speed typically may have a temperature of at least about 400°F., and for regenerative turbine typically of about 1000°F., before contact with the catalyst. In other systems, however, preheating may be as low as about 100°F., but it is advantageous to preheat to substantially higher temperatures in order to maximize the thermal efficiency of the system and to provide for a more compact design. Usually there is no need to preheat the fuel-air admixture above about 1500°F., and the catalyst serves to bring the temperature of the inlet gases from below the instantaneous auto-ignition temperature to the operating temperature, e.g., 1700°F to 3200°F.

The solid oxidation catalysts useful for the invention may include any of a number of catalysts used for the oxidation of fuels. Typically, the catalyst comprises a carrier and an active component with or without the addition of other activators or promoters. These catalysts may include a wide variety of materials as well as configurations or structures. For example, the catalyst may comprise a packed bed of pellets, saddles, rings, or the like. Preferably, the catalyst comprises a monolithic or unitary structure comprising a ceramic substrate or carrier impregnated with one or more catalytically-active components. Monoliths of this type may be shaped ceramic fiber usually in cylindrical form or thin-walled honeycomb-type structures. The flow channels in the honeycomb structures are usually parallel and may be of any desired cross-section such as triangular or hexagonal. The number of channels per square inch may vary greatly depending upon the particular application, and monolithic honeycombs are commercially available having anywhere from about 50 to 2000 channels per square inch. The substrate or carrier portion of the honeycomb desirably is porous, but may be essentially non-porous, and catalytically is relatively inert. The substrate may be provided with a porous film or coating, typically of alumina, which is impregnated with one or more catalytically-active components. Structures of this type are particularly desirable because the pressure drop of gases passing through them is relatively low, and generally they are self-supporting. The catalytically-active component of the catalyst is generally metal either in the elemental state or in the combined state such as an oxide. These metals usually include the heavy metals of the refractory type, for example, zirconium, vanadium, chromium, manganese, copper, platinum, palladium, iridium, rhodium, ruthenium, cerium, cobalt, nickel and iron. The particular catalyst and amount employed may depend primarily upon the design of the combustion system, the type of fuel used and operating temperature. The pressure drop of the gases passing through the catalyst, for example, may be below about 10 psi, preferably below about 3 psi, or less than about 10 percent of the total pressure.

According to another embodiment of the invention, a portion of the fuel is combusted in the catalytic combustion zone and the partially combusted effluent from the catalytic zone is further combusted thermally. The thermal combustion occurs essentially adiabatically and at an operating temperature above the instantaneous auto-ignition temperature but below a temperature that would result in any substantial formation of nitrogen oxides. This embodiment is particularly advantageous is providing a system having a faster response time due to the use of a lesser mass of catalyst. Thus, the extent of combustion occurring in the catalytic zone is dependent to a large extent upon residence time, and therefore complete combustion in the catalytic zone may require larger volume or mass of catalyst. Consequently, this larger mass takes longer to respond to changes in operating conditions. For example, in a turbine operation, if the temperature of the catalyst is changed and the speed of the turbine altered, the operation will not be effective until most, if not all, of the catalyst is brought to the new operating temperature. This process may be too slow for a satisfactory turbine operation where the turbine is employed in a system for fast response, such as an automobile.

In order to provide a combustion system having a faster response to changes in operating conditions, combustion can be effected by contacting a fuel-air admixture with a relatively smaller mass of catalyst. Oxidizable or combustible fuel components in the effluent from the catalyst are then thermally combusted. The system responds rapidly to desired changes in operation, and yet combustion still produces an effluent high in thermal energy and substantially free of nitrogen oxides as well as hydrocarbons and carbon monoxide as aforedescribed. Where desired, combustion may be further completed by contacting the effluent from the thermal combustion zone with a subsequent solid oxidation catalyst, which may advantageously be positioned between stages of the turbine to provide fast response time and to improve turbine efficiency. The resulting effluent is high in thermal energy and low in atmospheric pollutants.

In multi-stage combustion systems, the combustible fuel components passed to the thermal combustion zone may comprise partially combusted effluent from the catalyst zone, fuel-air admixture which did not contact the catalyst, or combinations containing the two. Such fuel-air admixtures may have adiabatic flame temperatures which provide combustion without producing any substantial amount of nitrogen oxides, e.g. adiabatic flame temperatures up to about 3000° or 3200°F. Thermal combustion occurs under essentially adiabatic conditions as described above, and is characterized by the mixture undergoing combustion having a theoretical adiabatic flame temperature which is substantially above the instantaneous auto-ignition temperature but below that which would result in any substantial formation of nitrogen oxides.

In the multi-stage system in which thermal combustion follows the catalytic zone, the effluent from the catalytic zone has a temperature sufficient to induce fast thermal combustion. This temperature is above the instantaneous auto-ignition temperature of the fuel-air admixture passed to the thermal combustion zone. The temperature of the effluent from the catalytic zone is generally at least about 1700°F. up to about 3200°F., preferably about 2000°F. up to about 3000°F. The temperatures attained in the thermal combustion zone will depend upon the adiabatic flame temperature of the admixture entering and undergoing combustion in this zone. Such temperatures are in the range of about 1700° to 3200°F., and preferably about 2000°F. to 3000°F.

In these systems, the volume of the catalytic combustion zone should be as small as possible, and preferably may be less than the volume of the thermal oxidation zone, to enhance the response time of the system. Thus the ratio of the thermal combustion zone volume to that of the catalytic combustion zone, which includes the catalyst voids, is preferably greater than about 1:1, or even at least about 1.5:1.

The volume of catalyst in the catalytic combustion zone of this multi-stage embodiment of the invention is preferably a minor portion of the total amount that would be needed to completely combust all of the fuel to carbon dioxide and water at the conditions of oxidation or combustion, and this amount of catalyst is at least sufficient to initiate and stabilize combustion. Thus, the volume of catalyst in this catalytic combustion zone may be less than about 0.5, preferably less than about 0.25, times the amount that would be needed for complete combustion of the fuel. This amount may be as little as about 0.02 or 0.01 or less of the volume needed for complete combustion of the fuel. In certain other embodiments of the invention, the volume of catalyst in this catalytic combustion zone may be a major portion or even the total amount of catalyst that is needed to completely combust all of the fuel to carbon dioxide and water at the conditions of oxidation. In any event, the amount of catalyst is sufficient to provide at least a significant amount of combustion in the catalytic zone, for instance, at least about 10 percent of the total heat released from complete combustion of the admixture fed to this catalyst.

In still a further embodiment of the invention, the temperature of the effluent from the combustion zone can be controlled by diluting the effluent with gas that has not passed through the combustion zone. Temperature control may be especially advantageous where the effluent is at a temperature higher than what is required or at a temperature higher than the tolerance of the turbine. Thus, relatively cool gas introduced to the effluent lowers the temperature of the effluent. Where desired, in a turbine operation, the gas can be heated by indirect heat exchange with the turbine effluent, and the resulting heated gas charged to the combustion effluent in a zone between the combustion zone and the entrance to the turbine.

The present invention is described further in connection with the following drawings in which.

Figure 2:
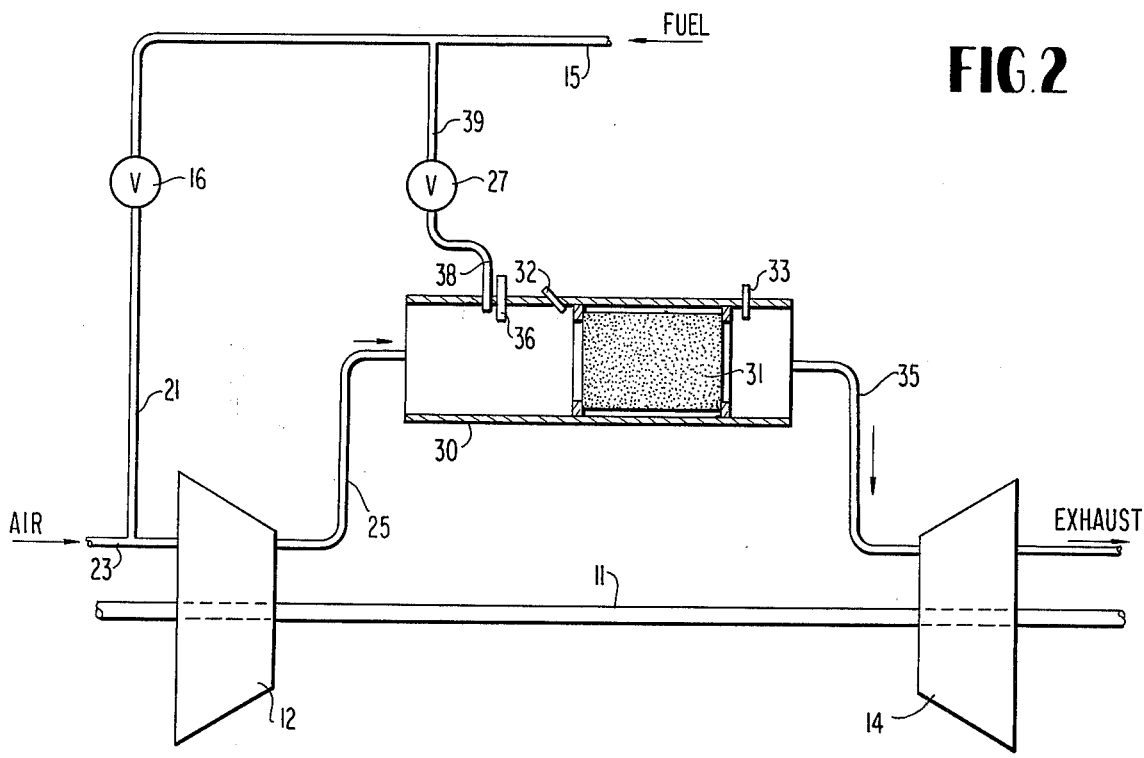
FIG. 2 is a schematic representation of a turbine system employing a combustion catalyst in accordance with the method of the present invention.

With reference to FIG. 2, power shaft 11 carries a turbine-type air compressor 12 and gas power turbine 14. Power shaft 11 can be connected to any suitable power transmission system to use the power imparted to the shaft by turbine 14. For example, turbine 14 may be employed to operate an electrical generator, or an automotive vehicle through an automatic transmission. Turbine 14 may be a high compression turbine having a compression ratio of 10:1. The structure operation and control of turbines are known in the art, and details in this regard are omitted from this description as they are unnecessary to explain the present invention. It might be noted, however, that turbines generally have compression ratios of at least about 2:1 and more typically at least about 5:1, and as a consequence combustion occurs at an elevated pressure relative to the ambient air pressure. The compression ratio refers to the approximate number of atmospheres of pressure under which the combustion takes place, e.g. a compression ratio of 10:1 indicates oxidation under approximately 10 atmospheres pressure or about 150 psig when the ambient air is at approximately one atmosphere as will generally be the case with turbines in automotive vehicles.

Line 15 having valve 16 feeds a suitable fuel, for example, straight run naphtha which is normally liquid, to the system, and line 21 passes the fuel to duct 23 for admixing with air. Compressor 12 increases the pressure and temperature of the admixture and the fuel is vaporized.

Line 25 conducts the vaporous admixture to catalytic combustor 30 which contains an oxidation catalyst 31. Ignitor 36 is disposed in the combustion adjacent fuel inlet 38 leading into the combustor. Line 39 having control valve 27 conducts fuel to the fuel inlet 38. Thermocouples 32 and 33 are positioned at the inlet and outlet respectively, of catalyst 31 to detect temperatures within the combustor at these locations. Line 35 passes the gaseous effluent from combustor 30 to power turbine 14 where the gases are expanded in the usual manner to impart rotating power to the turbine and shaft 11.

At start-up, valve 16 is closed and ignitor 36 is activated. Fuel enters the combustor through line 39 and inlet 38 and is burned to heat the catalyst until the temperature of the catalyst surface is high enough to maintain combustion of the fuel. Valve 16 is then opened, valve 27 is closed and ignitor 36 is inactivated. When operation has been established, valve 16 is open and the fuel-air admixture entering combustor 30 via line 25 is at a velocity prior to or at inlet to the catalyst in excess of the maximum flame propagation velocity.

Figure 1:
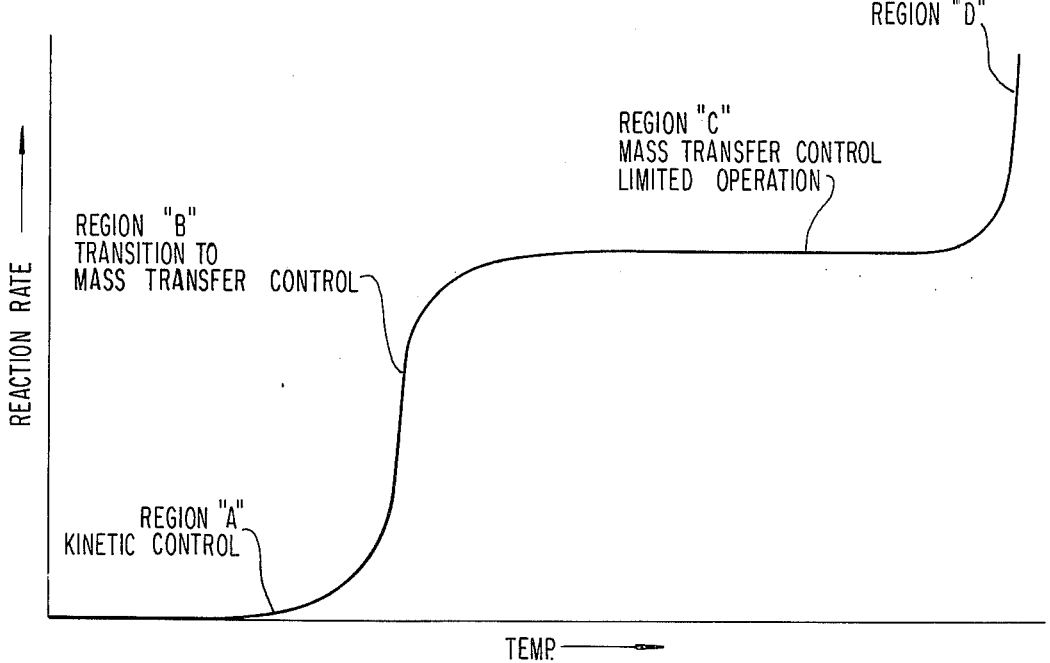
Figure 3:
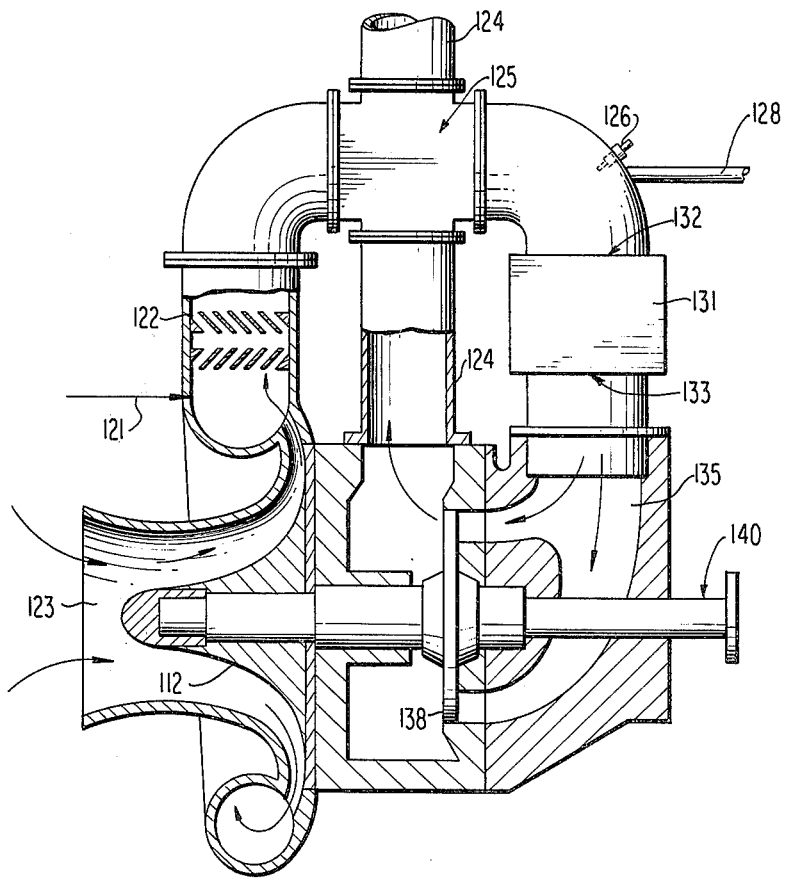
FIG. 3 is a cross-sectional diagramatic view of a turbine embodying a combustion catalyst operated in accordance with the method of the present invention.

FIG. 3 shows another embodiment of the present invention. Accordingly, air enters compressor 112 by inlet 123. Fuel from line 121 is charged into the compressed air stream, and this mixture is then passed through mixing vanes 122 and preheated in exchanger 125 where heat is supplied by indirect contact with the exhaust gases from the turbine exiting by way of line 124. The admixture of heated fuel and air then passes ignitor 126 and propane inlet line 128 which are employed during start-up substantially as described in connection with the embodiment of FIG. 2. The gaseous admixture is contacted with an oxidation catalyst in housing 131. Temperatures of the inlet and outlet of the catalyst are ascertained by thermocouples 132 and 133, respectively. Combustion gases pass by line 135 to power turbine 138 which is propelled by the gases and imparts power to output shaft 140. Exhaust gases exit from the turbine by way of line 124 as described above.

Figure 4:
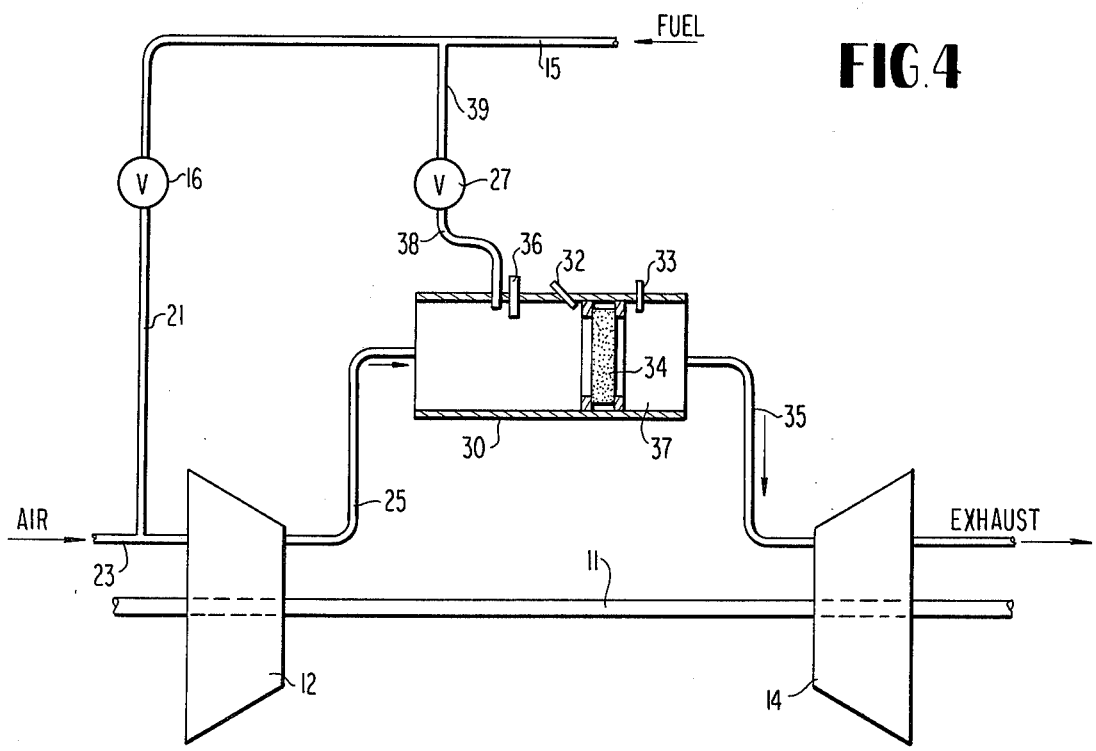
FIG. 4 is a schematic representation of another embodiment of the invention in which the catalytically-supported thermal combustion is followed by thermal combustion.
Figure 5:
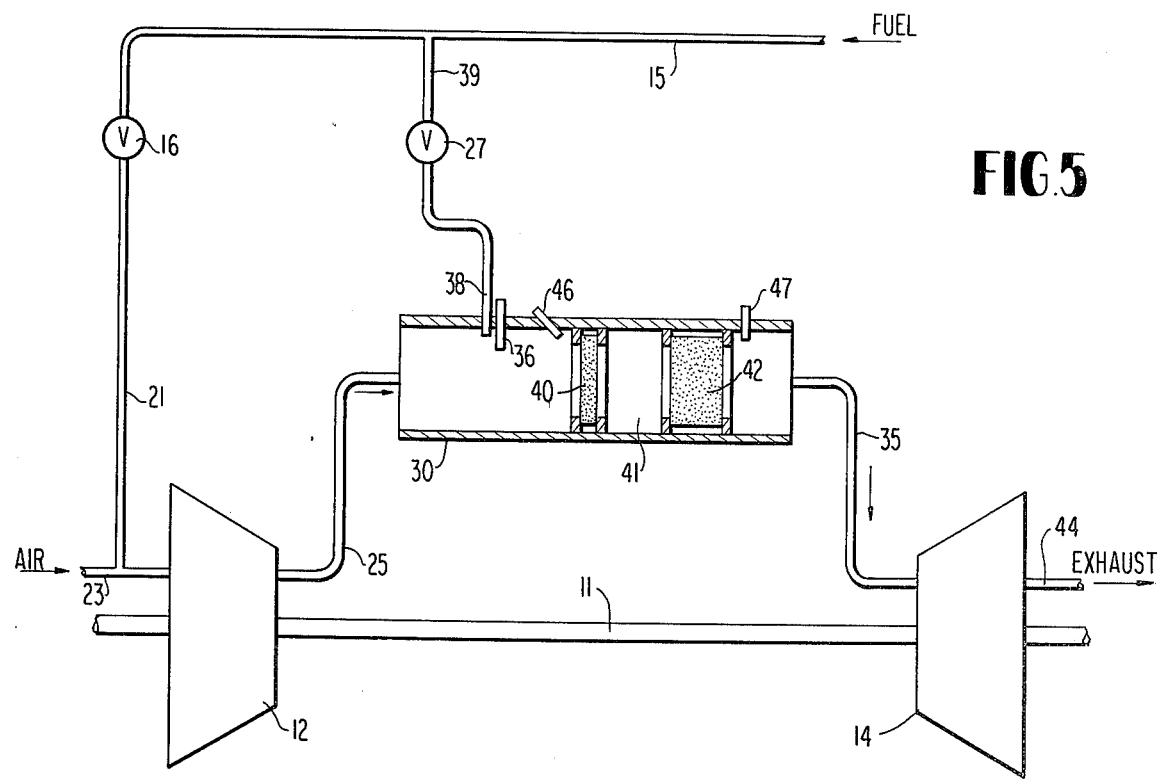
FIG. 5 is a schematic representation of a further embodiment of the invention employing two catalysts for combustion and an intermediate thermal zone.
Figure 6:
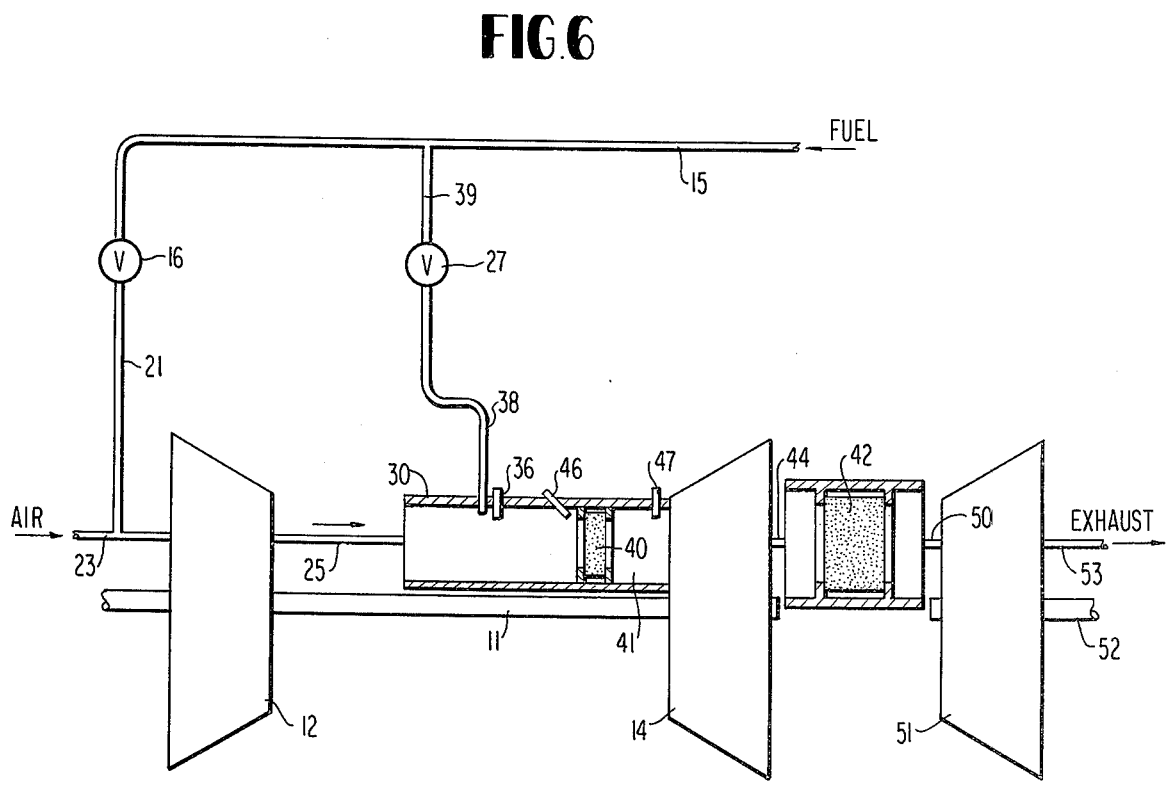
FIG. 6 shows a further modification of the invention in which a catalyst for combustion is placed between turbine stages.

The additional embodiments of the invention shown in FIGS. 4, 5 and 6 are similar in operation to the embodiment of FIG. 2, and like numerals designate similar parts.

In the system shown in FIG. 4, fuel-air admixture exits compressor 12 by line 25 and passes to combustor 30 containing a catalyst zone 34 and thermal combustion zone 37 which has a greater volume than zone 34. The fuel-air admixture flows through the combustor and its catalyst without significant pressure drop. Thermocouples 32 and 33 are positioned at the inlet of catalyst 34 and the exit end of catalyst zone 34, respectively, to record the temperatures at these locations.

Start-up may be essentially the same as that described for the system shown in FIG. 2. After catalyst 34 is brought to the operating temperature, ignitor 36 is inactivated, and combustion proceeds in the catalyst zone 34. Catalyst 34 can be of such a size to provide for combustion of only a minor portion of the fuel. Subsequently, the major portion of the fuel is combusted by thermal combustion in combustion zone 37. Alternatively, the major portion of the combustion occurs in the catalytic zone. The catalyst 34 may, for example, have a gas flow path or length of ¾-inch while the length of combustion space 37 is 4 inches.

In the system depicted in FIG. 5, the admixture of air and fuel exits compressor 12 by line 25 and passes to combustor 30 containing two spaced catalysts 40 and 42 and an intermediate free combustion zone 41. The fuel-air admixture flows through the combustor and its catalysts without significant pressure drop. Thermocouples 46 and 47 are positioned at the inlet of catalyst 40 and the exit end of catalyst 42, respectively, to record the temperatures at these locations. Start-up and combustion proceed as described above, but with the additional feature that effluent from combustion zone 41 is further combusted by catalyst 42. The exhaust from line 44 can be used as a source of indirect heat for gases passed to the combustor.

According to the modification shown in FIG. 6, catalyst 42 is disposed downstream from turbine 14 to further combust the effluent from the turbine. The resulting effluent is then passed to turbine 51 which imparts power to shaft 52 and is then exhausted by line 53. In this system, turbine 14 is used as a so-called free turbine, and the effluent from free combustion zone 41 is discharged into turbine 14. The exhaust from line 53 can be used as a source of indirect heat for gases passed to combustor 30.

The following tests were made to illustrate the method of essentially completely combusting carbonaceous fuels by contact with a catalyst in order to obtain an effluent containing very small amounts of hydrocarbons, carbon monoxide and nitrogen oxides. In one test, the catalyst was of the honeycomb type having unobstructed gas flow paths therethrough, such as shown in U.S. Pat. No. 3,565,830. The catalyst was 1 inch long and 2½ inches in diameter and was composed of a support made of cordierite having a thin active alumina coating containing one weight percent of palladium (based on the catalyst) in catalytic form. The catalyst was mounted in a container as shown in U.S. Pat. No. 3,441,381. Propane fuel and air were separately supplied to a 2-inch diameter conduit leading to the catalyst. In order to heat the catalyst, the propane was burned with a flame at a distance from the catalyst so as not to impinge directly thereon and the resulting gases were passed through the catalyst until it had a temperature of about 1000°F. The air flow rate was then increased and the flame was thereby extinguished. The temperature of the gas just before the inlet to the catalyst then dropped to about 200°F., and combustion continued in the catalyst zone under essentially flameless combustion conditions.

During this test, the amount of propane passed to the catalyst was measured as 9 standard cubic feet per hour. Although air entering via the air-supply line was measured, as additional portion of air was aspirated into the open-ended feed tube so that the actual air to fuel ratio was not accurately measured but was sufficient so that the volume of free oxygen in the fuel-air admixture was at least about 1.5 times that needed for complete combustion of the fuel. Samples were taken of the effluent gases from such operations and one sample taken when the catalyst bed was at an indicated temperature of about 2245°F., analyzed 2 parts per million of nitrogen oxides and less than 2 parts per million carbon monoxide, and there was essentially complete combustion of the hydrocarbon constituents of the gas. With the air and propane inlet gases at ambient temperature, a mixture of 31 parts by weight air per part by weight of propane has an adiabatic flame temperature of approximately 2245°F. The air supplied to the catalyst during this period analyzed 3 parts per million nitrogen oxides and less than 2 parts per million carbon monoxide, and thus during the burning there was no detected production of nitrogen oxides and the effluent gases were very low in carbon monoxide. The heat release rate of this burner operation was about 8 million B.T.U.'s per hour per cubic foot of catalyst and was at least several times more than the mass transfer limited rate. This fuel-air mixture could be charged to this catalytic system at a rate at least several times that used in the test and the desirable results of the invention be obtained.

In a similar type of test, an intimate mixture of straight run naphtha vapors and air was combusted by passage over catalyst spheres ⅛ inch in diameter containing copper chromite supported on an activated alumina. The catalyst was in a bed 3 inches long and 1⅜ inches in diameter. In this test, effluent gases were collected when the temperature of the gas immediately downstream of the catalyst was at about 2410°F., and thus the catalyst was at a somewhat higher temperature. The effluent gas contained 4.5 percent by volume $CO_2$, 12 parts per million nitrogen oxides, and 110 parts per million carbon monoxide, and the fuel was essentially completely combusted. By calculation, these results indicate that during this test there was a large excess of air to fuel supplied to the inlet of the catalyst.

The following test was made using the combustion chamber apparatus as shown in FIG. 5 to illustrate essentially complete combustion of the carbonaceous fuels. Thus, the fuel is partially combusted in catalytic combustion zone 40. Subsequently, the partially combusted effluent is thermally combusted in free combustion space 41, and then the gases are passed through catalyst 42 to combust remaining contaminants or combustibles, if present, in the gases and thereby obtain an effluent gas containing minimal amounts of hydrocarbons, carbon monoxide and nitrogen oxides. In this test, the catalysts were of the honeycomb type having unobstructed gas flow paths therethrough, such as shown in U.S. Pat. No. 3,565,830, and were held tightly and and spaced-apart inside a steel conduit. The catalysts were composed of a support made of cordierite 1⅜ inches in diameter and having a thin, active alumina coating containing 0.35 percent of platinum (based on the catalyst) in catalytic form. The initial catalyst 40 was ¾ inch in length (gas flow path) and the downstream catalyst 42 was 2 inches in length. A thermal oxidation space 41 of 2 inches was provided between the catalysts in the direction of gas flow.

Preheated air was supplied through an open end of the conduit leading to initial catalyst 40 until the catalyst reached a temperature of about 1100° to 1200°F. Gasoline was then added to the preheated air stream and flameless ignition of the fuel-air mixture was established in the initial catalyst. The resulting gases were passed through both catalysts and the intervening space. During the tests, the maximum gas temperature, as indicated by the reactor wall color, was achieved in the 2-inch zone between the catalyst sections. The effluent gases were collected at a time when the adiabatic flame temperature was about 2900°F. The effluent gas analyzed 7 ppm nitrogen oxides, 20 ppm carbon monoxide and 0.6 ppm hydrocarbons. By calculation, these results indicate that a large excess of oxygen to fuel was supplied to the inlet of the combustion zone during this test.

The process of the present invention was further exemplified in additional runs in which the fuel was essentially completely combusted, and a low emissions effluent produced. The combustion system comprised a source of preheated air supplied under pressure. A portion of the air was passed through a pipe to the combustion zone and the remainder was used to cool and dilute the combustion effluent. Unleaded gasoline fuel was atomized into the air passing to the combustion zone countercurrent to the air flow to insure intimate mixing.

In the first series of runs, the catalyst was of the monolithic, honeycomb-type having a nominal 6-inch diameter and was disposed within a metal housing as two separate pieces each having parallel flow channels 2¼ inches in length extending therethrough. There was a small space of about ¼-inch between these pieces. Both pieces of catalyst had approximately 100 flow channels per square inch of cross-section with the walls of the channels having a thickness of 10 mils. The catalysts had similar compositions and were composed of a zircon mullite honeycomb support which carried a coating of alumina containing palladium, chromina and ceria.

The catalyst for these runs typically can be made by slurrying 2400 grams of activated alumina powder, less than 40 mesh in size, in a mixer with a solution prepared by dissolving 2526 grams $Cr(NO_3)_3 \cdot 9\ H_2O$ and 1382 grams $Ce(NO_3)_3 \cdot 6\ H_2O$ in 890 ml. $H_2O$. The mixture was dried at 120° C. over a weekend. The dried solids were crushed and screened to less than 40 mesh, and then the powder was calcined for 4 hours at 1000°C. 3200 grams of the powder was charged to a 3.4 gallon ball mill along with 3200 ml. $H_2O$ and 145.4 grams of palladium nitrate. The mill was rolled for 17 hours at 54 RPM. The resulting slip has a density of 1.63 grams per ml., a pH of 4.20 and a viscosity of 12 centipoises. 1625 grams of the as-recovered slip were diluted with 1180 ml. of a 1 percent nitric acid solution. The zircon mullite honeycomb was dipped in the diluted slip and held for one minute, and then withdrawn from the slip and blown with air to remove excess slip. The coated honeycomb was dried for 16 hours at 110°C. and then calcined for 2 hours at 500°C. The honeycomb was cooled, and showed a pickup of 11.0 weight percent slip or coating.

The upstream or initial catalyst in the housing had a catalytic coating which comprised 13.9 weight percent of the catalyst. This coating was 70 weight percent alumina, 14 weight percent $Cr_2O_3$ and 16 weight percent $CeO_2$ based on these components. The catalyst also contained 0.23 weight percent palladium (calculated) disposed in the coating. The subsequent-in-line catalyst had a similar coating of alumina, ceria and chromia which was 11.0 weight percent of the catalyst. The catalyst also contained 0.18 weight percent palladium (calculated) disposed in the coating.

Provision was made for contacting with the catalyst the fuel mixed with a portion of the total air stream. That portion of the total air stream not mixed with the fuel was added to the combustion effluent immediately upon its exit from the catalyst zone. This dilution or secondary air cooled the combustion effluent and samples of the mixture were taken for analysis. Thermocouples were located adjacent the initial catalyst inlet and at the sampling position to detect the temperatures of these locations.

The catalysts were brought to reaction temperature by contact with preheated air, and subsequent contact with the air-fuel mixture which caused combustion and raised the catalyst temperature further. Two periods of operation and the results obtained using this system in accordance with the present invention are reported in Table I below as Runs A and B, respectively.

The same reaction system and procedures were used in additional combustion runs employing different catalyst pieces that were disposed in the combustion zone to provide a thermal reaction space between the pieces. The catalysts had zircon mullite honeycomb supports and the initial catalyst had about 600 parallel gas flow channels per square inch of cross-section, while the second catalyst had about 100 channels per square inch. The gas flow path length of the first catalyst was two inches and of the second catalyst was 1 inch. The free space between the catalysts was 1⅝ inches in the direction of gas flow.

The catalysts were nominally 6 inches in diameter and were made as described above for the catalysts used in Runs A and B. Both catalysts contained a coating comprised of 70 weight percent alumina, 16 weight percent $CeO_2$ and 14 weight percent $Cr_2O_3$, based on these components. The coating for the initial catalyst comprised 13.5 weight percent along with 0.26 weight percent palladium disposed in the coating, and the coating for the second catalyst was 15.5 weight percent and there was 0.26 weight percent palladium disposed in the coating. Two periods of operation and the results obtained using this system in accordance with the present invention are reported in Table I below as Runs C and D, respectively.

TABLE I

| RUN | Combustion Results | | | |
| --- | --- | --- | --- | --- |
|  | A | B | C | D |
| Reactions Conditions | | | | |
| Fuel rate, pounds per hour | 62 | 124 | 72 | 114 |
| Total air rate, pounds per second | 0.76 | 1.4 | 1.2 | 1.8 |
| Amount of air mixed with fuel, pounds per second | 0.61 | 1.1 | 0.7 | 1.1 |
| Amount of dilution air, pounds per second | 0.15 | 0.3 | 0.5 | 0.7 |
| Pressure of air stream, atmospheres | 1.9 | 2.9 | 3.0 | 4.3 |
| Nominal air velocity approaching catalyst inlet, feet per second | 40 | 50 | 35 | 35 |
| Fuel-air mixture temperature, °F. | 695 | 785 | 880 | 815 |
| Catalyst temperature, °F. (estimated by radiation pyrometry) | 2310 | 2470 | 2430 | 2400 |
| Temperature of diluted combustion effluent, °F. | 1700–2100 | 1800–2200 | 1800–2100 | 1900–2100 |
| Analysis of Diluted Combustion Effluent, ppmv | | | | |
| $NO_x$ | 0.2 | — | 0.7 | — |
| CO | 85 | 43 | 13 | 12 |
| Hydrocarbons (reported on propane basis) | 6 | 4 | 3.5 | 7 |

The data of Table I illustrate the effectiveness of the process of this invention in providing essentially complete combustion of relatively large quantities of fuel for a given amount of catalyst. No flashback was encountered in these runs. The combustion effluents were exceedingly low in materials that are considered to be undesirable atmospheric pollutants, including nitrogen oxides.

In addition to employing the method of the present invention for powering gas turbines, the combustion system can be employed, for example, as a heat source in steam boilers wherein the heat of the exhaust gases are employed to generate steam as in a water-tube boiler, air heaters, hot water heaters and process furnaces. The method of the invention may also be used to partially combust carbonaceous fuels for various pur-

What is claimed is:

1. A method for the catalytically-supported, thermal combustion of carbonaceous fuel comprising (a) forming an intimate admixture of fuel and air, (b) contacting in a combustion zone at least a portion of said fuel-air admixture with solid oxidation catalyst occupying a major portion of the flow cross section of said combustion zone, and (c) thereby effecting sustained combustion of at least a portion of said fuel under essentially adiabatic conditions at a rate surmounting the mass transfer limitation to form an effluent of high thermal energy; said combustion being characterized by said fuel-air admixture having an adiabatic flame temperature such that upon contact with said catalyst, the operating temperature of said catalyst is substantially above the instantaneous auto-ignition temperature of said fuel-air admixture but below a temperature that would result in any substantial formation of oxides of nitrogen.

2. The method according to claim 1 which includes the additional step of thermally combusting the remaining combustible portion of said fuel.

3. The method according to claim 1 which includes the step of thermally combusting a partially combusted effluent from (c).

4. The method according to claim 1 wherein at least a portion of said fuel-air admixture from (a) is further admixed with the combustion effluent from (c), and the resulting admixture is thermally combusted.

5. The method according to claim 1 including the step of adding air to the effluent, said air having a temperature lower than that of said effluent, thereby cooling the effluent.

6. The method according to claim 1 in which the combustion effluent is employed to produce power.

7. The method according to claim 1 in which the fuel in the admixture passed to (b) is in an amount equivalent to heating value to at least about 300 pounds of propane per hour per cubic foot of catalyst.

8. The method according to claim 7 wherein said admixture has an adiabatic flame temperature of about 1700° to 3200°F.

9. The method according to claim 8 wherein said adiabatic flame temperature is about 2000°F. to about 3000°F.

10. The method according to claim 9 in which said fuel is hydrocarbon.

11. The method according to claim 1 in which said admixture contains at least about 1.5 times the stoichiometric amount of oxygen based on complete combustion of said fuel.

12. The method according to claim 10 in which said admixture contains at least about 1.5 times the stoichiometric amount of oxygen based on complete combustion of said fuel.

13. The method according to claim 12 in which the residence time of the admixture undergoing combustion is less than about 0.05 second.

14. The method according to claim 3 wherein said admixture has an adiabatic flame temperature of about 1700° to 3200°F.

15. The method according to claim 14 in which said fuel is hydrocarbon.

16. The method according to claim 15 in which the fuel in the admixture passed to (b) is an amount equivalent to heating value to at least about 300 pounds of propane per hour per cubic foot of catalyst.

17. The method according to claim 14 in which said admixture contains at least about 1.5 times the stoichiometric amount of oxygen based on complete combustion of said fuel.

18. The method of claim 16 in which the combustion effluent is employed to produce power.

19. A method for the essentially adiabatic combustion of an intimate admixture comprising carbonaceous fuel and air, said fuel when burned with a stoichiometric amount of air having an adiabatic flame temperature of at least about 3300°F., comprising: effecting sustained, essentially adiabatic combustion of at least a portion of said admixture in a combustion zone at a rate surmounting the mass transfer limitation through contact with solid oxidation catalyst occupying a major portion of the flow cross section of said combustion zone and having a temperature of about 1700°F. to 3000°F., said admixture having an adiabatic flame temperature of about 1700° to 3000°F. at the conditions at the inlet of said catalyst, the volume of free oxygen to fuel charged to the combustion system being at least about 1.5 times the stoichiometric amount needed for complete combustion of said fuel, and said admixture being in the flammable range or on the fuel-lean side outside of the flammable range and having a gas velocity prior to or at the inlet to said catalyst in excess of the maximum flame propagating velocity.

20. The method according to claim 19 in which the fuel is passed to the catalytic zone in an amount equivalent to heating value to at least about 300 pounds of propane per hour per cubic foot of catalyst.

21. The method according to claim 20 in which the fuel is hydrocarbon.

22. The method according to claim 19 in which the effluent from said catalyst is in a partially combusted state and is further thermally combusted at a temperature of about 1700° to 3000°F. without formation of a substantial amount of nitrogen oxides.

23. The method according to claim 22 in which the amount of catalyst in said catalytic zone is less than about 0.5 of the amount of catalyst needed to essentially completely combust said fuel to carbon dioxide and water.

24. The method according to claim 22 in which the fuel is hydrocarbon.

25. The method according to claim 24 in which the combustion effluent is employed to produce power.

26. The method according to claim 19 in which the residence time of the admixture undergoing combustion is less than about 0.05 second.

27. A method for operating a gas turbine by the catalytically-supported, thermal combustion of carbonaceous fuel comprising (a) forming an intimate admixture of fuel and air, (b) contacting in a combustion zone at least a portion of said fuel-air admixture with solid oxidation catalyst occupying a major portion of the flow cross section of said combustion zone, and (c) thereby effecting sustained combustion of at least a portion of said fuel under essentially adiabatic conditions at a rate surmounting the mass transfer limitation to form an effluent of high thermal energy; said combustion being characterized by said fuel-air admixture having an adiabatic flame temperature such that upon contact with said catalyst, the operating temperature of said catalyst is substantially above the instantaneous auto-ignition temperature of said fuel-air admixture but below a temperature that would result in any substantial formation of oxides of nitrogen, and (d) passing effluent from said combustion through a gas turbine to rotate the turbine.

28. The method according to claim 27 which includes the additional step of thermally combusting the remaining combustible portion of said fuel, and passing resulting effluent to (d).

29. The method according to claim 27 which includes the step of thermally combusting a partially combusted effluent from (c), and passing resulting effluent to (d)

30. The method according to claim 27 wherein at least a portion of said fuel-air admixture from (a) is further admixed with the combustion effluent from (c), the resulting admixture is thermally combusted, and passing resulting effluent to (d).

31. The method according to claim 27 in which said fuel is hydrocarbon.

32. The method according to claim 27 in which said admixture contains at least about 1.5 times the stoichiometric amount of oxygen based on complete combustion of said fuel.

33. The method according to claim 32 in which the fuel in the admixture passed to (a) is in an amount equivalent in heating value to at least about 300 pounds of propane per hour per cubic foot of catalyst.

34. A method for operating a gas turbine by the essentially adiabatic combustion of an intimate admixture comprising the carbonaceous fuel and air, said fuel when burned with a stoichiometric amount of air having an adiabatic flame temperature of at least about 3300°F., comprising: effecting sustained, essentially adiabatic combustion of at least a portion of said admixture in a combustion zone at a rate surmounting the mass transfer limitation through contact with solid oxidation catalyst occupying a major portion of the flow cross section of said combustion zone and having a temperature of about 1700° to 3000°F., said admixture having an adiabatic flame temperature of about 1700° to 3000°F. at the conditions at the inlet of said catalyst, the volume of free oxygen to fuel charged to the combustion system being at least about 1.5 times the stoichiometric amount needed for complete combustion of said fuel, and said admixture being in the flammable range or on the fuel-lean side outside of the flammable range and having a gas velocity prior to or at the inlet to said catalyst in excess of the maximum flame propagating velocity, and passing effluent gases from said combustion through a gas turbine to rotate the turbine.

35. The method according to claim 34 in which the fuel is passed to the catalytic oxidation zone in an amount equivalent in heating value to at least about 300 pounds of propane per hour per cubic foot of catalyst.

36. The method according to claim 35 in which the effluent from said catalyst is in a partially combusted state and is further thermally combusted at a temperature of about 1700° to 3000°F. without formation of a substantial amount of nitrogen oxides.

37. The method according to claim 36 in which the fuel is hydrocarbon.

38. The method according to claim 37 in which the amount of catalyst in said catalytic zone is less than about 0.5 of the amount of catalyst needed to essentially completely combust said fuel to carbon dioxide and water.

39. The method according to claim 38 in which the weight ratio of air to fuel in said admixture is above about 30:1.

40. The method according to claim 35 in which the fuel is hydrocarbon.

41. The method according to claim 40 in which the weight ratio of air to fuel in said admixture is above about 30:1.

42. A method for the catalytically-supported, thermal combustion of carbonaceous fuel comprising (a) forming an intimate admixture of fuel and air, said admixture containing at least about 1.5 times the stoichiometric amount of oxygen based on complete combustion of said fuel, (b) contacting in a combustion zeon at least a portion of said fuel-air admixture with solid oxidation catalyst occupying a major portion of the flow cross section of said combustion zone, (c) thereby effecting sustained combustion of at least a portion of said fuel at a rate surmounting the mass transfer limitation under essentially adiabatic conditions in which the residence time of the admixture undergoing combustion is less than about 0.05 second, and the amount of catalyst is less than about 0.5 of the amount needed to essentially completely combust said fuel to carbon dioxide and water, and (d) thermally combusting the partially combusted portion from (b), whereby an effluent of high thermal energy is formed; said combustion being characterized by said fuel-air admixture having an adiabatic flame temperature such that upon contact with said catalyst, the operating temperature of said catalyst is substantially above the instantaneous auto-ignition temperature of said fuel-air admixture but below a temperature that would result in any substantial formation of oxides of nitrogen.

* * * * *

UNITED STATES PATENT AND TRADEMARK OFFICE
CERTIFICATE OF CORRECTION

PATENT NO. : 3,928,961
DATED : December 30, 1975
INVENTOR(S) : WILLIAM C. PFEFFERLE It is certified that error appears in the above-identified patent and that said Letters Patent are hereby corrected as shown below:

Column 3, line 49, after "5" and before "10", delete the word "to" and substitute --or--

Column 4, line 26, after "ratios" and before "to", insert --of up--

Column 5, line 65, "throughout" should read --throughput--

Column 6, line 29, "Emmission" should read "Emission"

Column 9, line 55, after the phrase "disposed in the" delete the word "combustion" and insert the word --combustor--

Column 11, line 34, after "measured" and before "additional" delete "as" and substitute --an--

Column 12, line 24, after "tightly" and before "spaced-apart" delete "and" so that the phrase will read "tightly and spaced-apart"

Column 13, line 4, after palladium, and before and, the word "chromina" should read --chromia--

Column 15, claim 7, line 41, delete "to" and substitute --in--

Column 16, claim 16, line 1, delete "to" and substitute --in--

Column 16, claim 20, line 32, delete "to" and substitute --in--

Column 18, claim 42, line 32, the word "zeon" should read --zone--

Signed and Sealed this sixteenth Day of March 1976

[SEAL]

Attest:

RUTH C. MASON
Attesting Officer

C. MARSHALL DANN
Commissioner of Patents and Trademarks